UNITED STATES PATENT OFFICE.

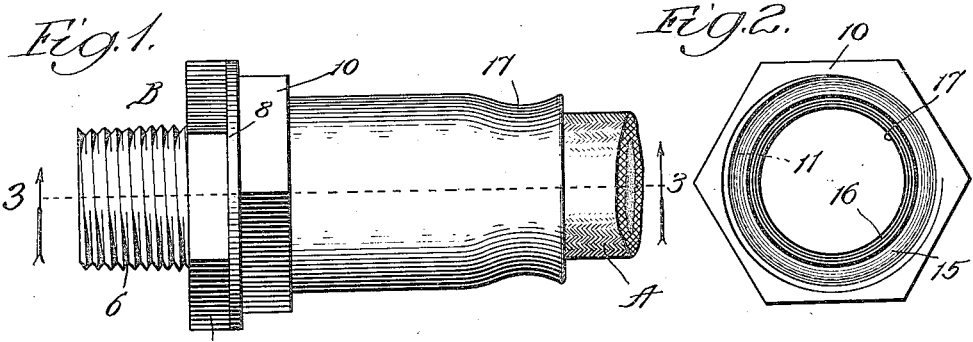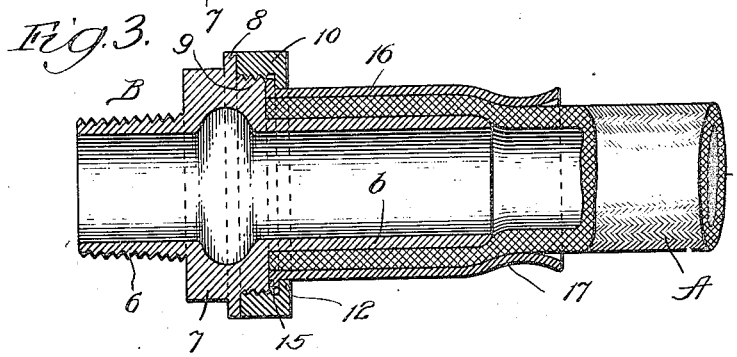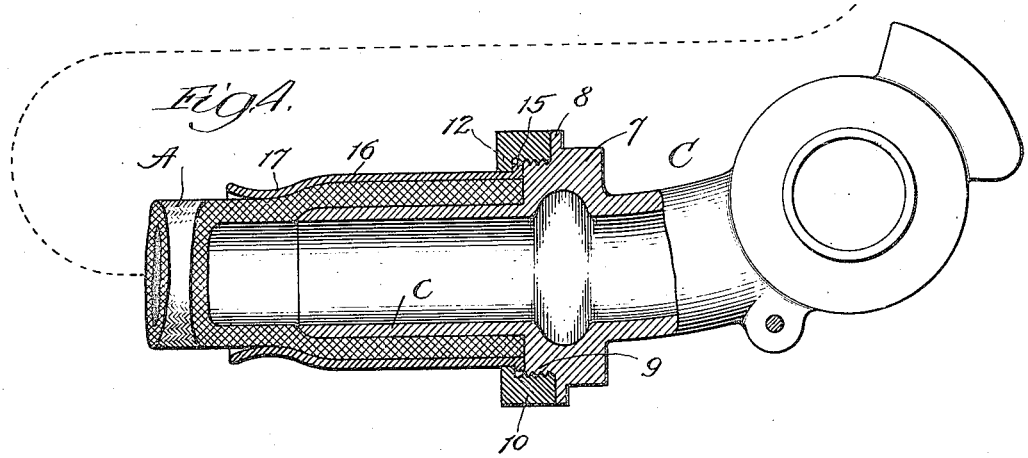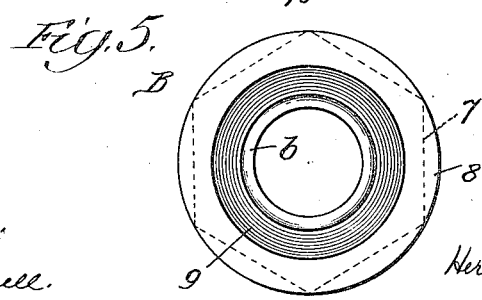

HERBERT H. HEWITT AND CHARLES H. PAEPLOW, JR., OF BUFFALO, NEW YORK.

HOSE-COUPLING.

1,224,638. Specification of Letters Patent. Patented May 1, 1917.

Application filed August 29, 1912. Serial No. 717,815.

*To all whom it may concern:*

Be it known that we, HERBERT H. HEWITT and CHARLES H. PAEPLOW, Jr., citizens of the United States, and residents of the city of Buffalo, county of Erie, and State of New York, have invented certain new and useful Improvements in Hose-Couplings, of which the following is a full, clear, and exact description, reference being had to the accompanying drawing, forming part of this specification.

Our invention has for its object to provide a simple, cheap, strong and effective construction of hose coupling which, while more especially adapted for attaching hose to air brake couplings, will be found advantageous for uses in other situations. The invention consists in the features of novelty hereinafter described, illustrated in the accompanying drawing, and particularly pointed out in the claims at the end of this specification.

Figure 1 is a view in side elevation showing an embodiment of our invention. Fig. 2 is an inner end view of the sleeves with the coupling ring thereon. Fig. 3 is a view in central, longitudinal section on line 3—3 of Fig. 1. Fig. 4 is a view similar to Fig. 3 but showing the invention applied to one of the coupling members of an air brake hose, part of this coupling being shown in side elevation. Fig. 5 is an end view of the body of the coupling.

In the accompanying drawing, our invention is shown for coupling a section of hose A at one end to a nipple B that engages the train pipe of an air-brake system, and at its other end to one of the coupling members C whereby the train pipe of connected cars will be united. The nipple B is shown as provided with the usual threaded portion 6 adapted to engage the train pipe, the body of the nipple being preferably formed with a polygonal portion 7 adapted to be engaged by a wrench. Adjacent the polygonal portion 7 of the nipple B is formed a flange or shoulder 8 and a screw threaded portion 9 adapted to receive a correspondingly interiorly threaded coupling ring 10. The exterior surface of the coupling ring 10 may be of polygonal outline, as shown, to be engaged by an ordinary wrench.

The coupling ring 10 is formed with an inwardly projecting, annular flange 12 adapted to engage an outwardly projecting portion, preferably an annular flange 15 formed on the inner end of a sleeve 16. This sleeve 16 is adapted to encircle the end of the hose A after the latter has been drawn over a reduced shank *b* that projects from the body of the nipple B, as clearly shown in Fig. 3 of the drawing. The sleeve 16 is somewhat longer than the shank *b* and the free end of the sleeve 16 is contracted slightly at a point just beyond the end of the shank (as at 17) so that when the parts are assembled and in position for use, the contracted portion of the sleeve will firmly hold the hose by compressing or squeezing it between the end of the shank and the contracted portion of the sleeve, thereby preventing the hose from becoming detached from the shank of the coupling, by being pulled or blown off. Preferably, the extreme free end of the sleeve 16 is flared or bell-shaped, in order that the hose may not become kinked in bending over the edge of the sleeve, and may not be cut or injured at such point.

In Fig. 4 our invention is shown as applied to one of the coupling members of an air-brake hose and in this form the shank *c* of the coupling member is adapted to enter the end of the hose and is encircled by a sleeve 16 corresponding to the sleeve 16 hereinbefore described, this sleeve being held in position by a retaining ring 10 corresponding to a like retaining ring in Fig. 3 and similarly engaging a threaded portion 9 of the body of the coupling member.

In assembling the parts, the sleeve 16, with the ring 10 thereon, will first be slipped onto the hose, the free end of which will then be forced over the shank *b* of the nipple (or the shank *c* of the coupling member). The sleeve 16 will then be pushed toward the end of the hose, so as to encircle both the hose and the shank, and the ring 10 will then be screwed on to the threaded portion 9 of the body of the nipple or coupling member. As the ring 10 is screwed toward the flange or shoulder 8, it will draw the sleeve 16 with it, thereby causing the contracted portion 17 of the free end of the sleeve 16 to compress or squeeze the hose A against the end portion of the shank. In the construction shown, this final compression of the hose between the free end of the shank and the contracted portion of the sleeve is accomplished without any turning of the sleeve upon the hose, thereby avoiding wear of the hose and allowing the firm compression of the hose to be more effectively accomplished than would be possible if the sleeve were turned upon the hose to effect its final adjustment.

The shank $b$ is cylindrical and coupling sleeve 16, except for its outer contracted end, is also cylindrical, so that the walls of the hose receiving space between the shank and sleeve are cylindrical and substantially parallel throughout the greater portion of the length of the shank. However, the contracted outer end portion of the sleeve forms an internal annular rib which is preferably located just beyond the end of the shank, and which contracts the hose receiving space at the end of the shank. By reason of this construction, the greater part of the clamping pressure upon the hose is concentrated upon the portion of the hose which is gripped between the end of the shank and the contracted outer end portion or rib 17 of the sleeve. This arrangement is advantageous, particularly with couplings such as those employed for connecting air brake hose which must withstand considerable pressure, since by concentrating the larger portion of the clamping pressure throughout a small section of the sleeve and shank, a tight joint between the parts is more easily made and with greater certainty. Furthermore, the necessary pressure to effect a tight joint is less than if attempt were made to distribute the clamping pressure uniformly throughout all portions of the shank and sleeve. Again, by applying the greater part of the clamping pressure at the end of the shank, air cannot force its way between the shank and the end of the hose and the latter can firmly adhere to the surface of the shank. The hose engaging surfaces of the shank and sleeve are smooth, so that they will not mar or injure the hose. For similar reasons the contracted portion or rib 17 is provided with a rounded inner surface and the sleeve terminates, beyond the rib, in a flaring, bell-like mouth. Preferably also, the end of the shank against which the hose is clamped by the rib, is rounded as shown.

Not only does our invention provide a most secure and effective means for gripping or holding the hose upon the shank of the coupling to which it is attached (and the term "coupling" is to be understood as including any parts such as a nipple or coupling member to which my invention is applicable), but it also affords a most efficient means for protecting the end portion of the hose. The sleeve 16 not only acts as a shield to guard against the kinking and chafing of the hose, but also serves to guard the hose from external injury by being bruised or jammed against the shank of the coupling or nipple on which it is mounted. The sleeve 16 and ring 10 can be attached to the coupling whether the hose be mounted upon it or not, and will remain attached to the coupling in case the hose should be accidentally pulled off, so the danger of the parts being lost is avoided.

While we prescribe what we regard as the preferred embodiment of our invention, it will be understood that the details thereof may be varied within wide limits without departure from the scope of the invention, and to such details thereof we do not wish the invention to be understood as limited.

Having thus described our invention, what we claim as new, and desire to secure by Letters Patent, is:—

1. A coupling for rubber hose and the like, comprising a body portion having a rigid cylindrical shank adapted to fit within the end of the hose and a shoulder at the inner end of said shank, and a cylindrical sleeve adapted to encircle the shank and the hose thereon and having connecting means at its inner end for engaging said shoulder, said sleeve and said shank having substantially parallel, cylindrical hose-engaging surfaces and said sleeve being longer than said shank and having an internal rib at its outer end, said sleeve being arranged and adapted to be moved inwardly over said shank in straight line direction to compress the hose between said rib and the outer end of said shank, substantially as described.

2. A coupling for rubber hose and the like, comprising a body portion having a rigid cylindrical shank adapted to fit within the end of the hose and a shoulder at the inner end of said shank, and a cylindrical sleeve adapted to encircle the shank and hose thereon, said sleeve and said shank having substantially parallel, cylindrical hose-engaging surfaces, said sleeve being longer than said shank and having an internal rib at its outer end, and connecting means between the inner end of said sleeve and said shoulder adapted to move said sleeve inwardly in straight axial direction over said shank to compress the hose between said rib and the outer end of said shank, said rib and the outer end of said shank having convexly rounded hose-engaging surfaces, substantially as described.

HERBERT H. HEWITT.
CHARLES H. PAEPLOW, Jr.

Witnesses:
FRANK H. VAN DERBECK,
PERCY P. TEAL.